United States Patent [19]

Peters et al.

[11] Patent Number: 4,999,766
[45] Date of Patent: Mar. 12, 1991

[54] MANAGING HOST TO WORKSTATION FILE TRANSFER

[75] Inventors: Anthony M. Peters, Bedford; Mark A. Sehorne, Grapevine, both of Tex.

[73] Assignee: International Business Machines Corporation, Armonk, N.Y.

[21] Appl. No.: 205,969

[22] Filed: Jun. 13, 1988

[51] Int. Cl.$^5$ .............................................. G06F 15/16
[52] U.S. Cl. ..................................... 364/200; 364/228; 364/260; 364/283.1; 364/283.3; 364/283.4; 364/286

[58] Field of Search ... 364/200 MS File, 900 MS File

[56] References Cited

U.S. PATENT DOCUMENTS

| | | | |
|---|---|---|---|
| 4,205,371 | 5/1980 | Flather | 364/200 |
| 4,333,144 | 6/1982 | Whiteside et al. | 364/200 |
| 4,415,971 | 11/1983 | Guillemet et al. | 364/200 |
| 4,509,122 | 4/1985 | Agnew et al. | 364/200 |
| 4,642,758 | 2/1987 | Teng | 364/200 |
| 4,646,235 | 2/1987 | Hirosawa et al. | 364/200 |
| 4,782,442 | 11/1988 | Kojima et al. | 364/200 |
| 4,891,785 | 1/1990 | Donohoo | 364/900 |

OTHER PUBLICATIONS

Interconnecting Devices of Different Communication Protocols-R. A. Pascoe, IBM Technical Disclosure Bulletin, vol. 26, No. 7A, 12/83.
Microprocessing & Microprogramming, vol. 20, Nos. 1-3, Apr. 1987, pp. 73-76, North-Holland, Amsterdam, NL; H. Koke; "Integration of Personal Computers with Decvax Systems".
IBM Technical Disclosure Bulletin, vol. 26, No. 7B, Dec. 1983, pp. 3791-3794, New York, U.S.; M. Ebrahimi et al; "File Name Mapping Method Permitting Network Location Transparency".
IBM Technical Disclosure Bulletin, vol. 31, No. 3, Aug. 1988, p. 93, New York, U.S.; "Automatic Workstation-to-Host Configuration".

*Primary Examiner*—Michael R. Fleming
*Assistant Examiner*—Gopal C. Ray
*Attorney, Agent, or Firm*—Whitham & Marhoefer

[57] ABSTRACT

A technique is described for maintaining consistent filename conventions between multiple hosts and workstations by providing a table of default parameters for various hosts and workstations and the corresponding filetypes that are accessed to determine the default parameters and filetypes for a given file. A display is also provided to display the name or names of files to be transferred and their destination. The programs which produce these screens also obtain and display default information concerning the files, such as, the file names and the data structures for the files on the destination host computer or workstation. The user can either accept the default information or change it.

6 Claims, 6 Drawing Sheets

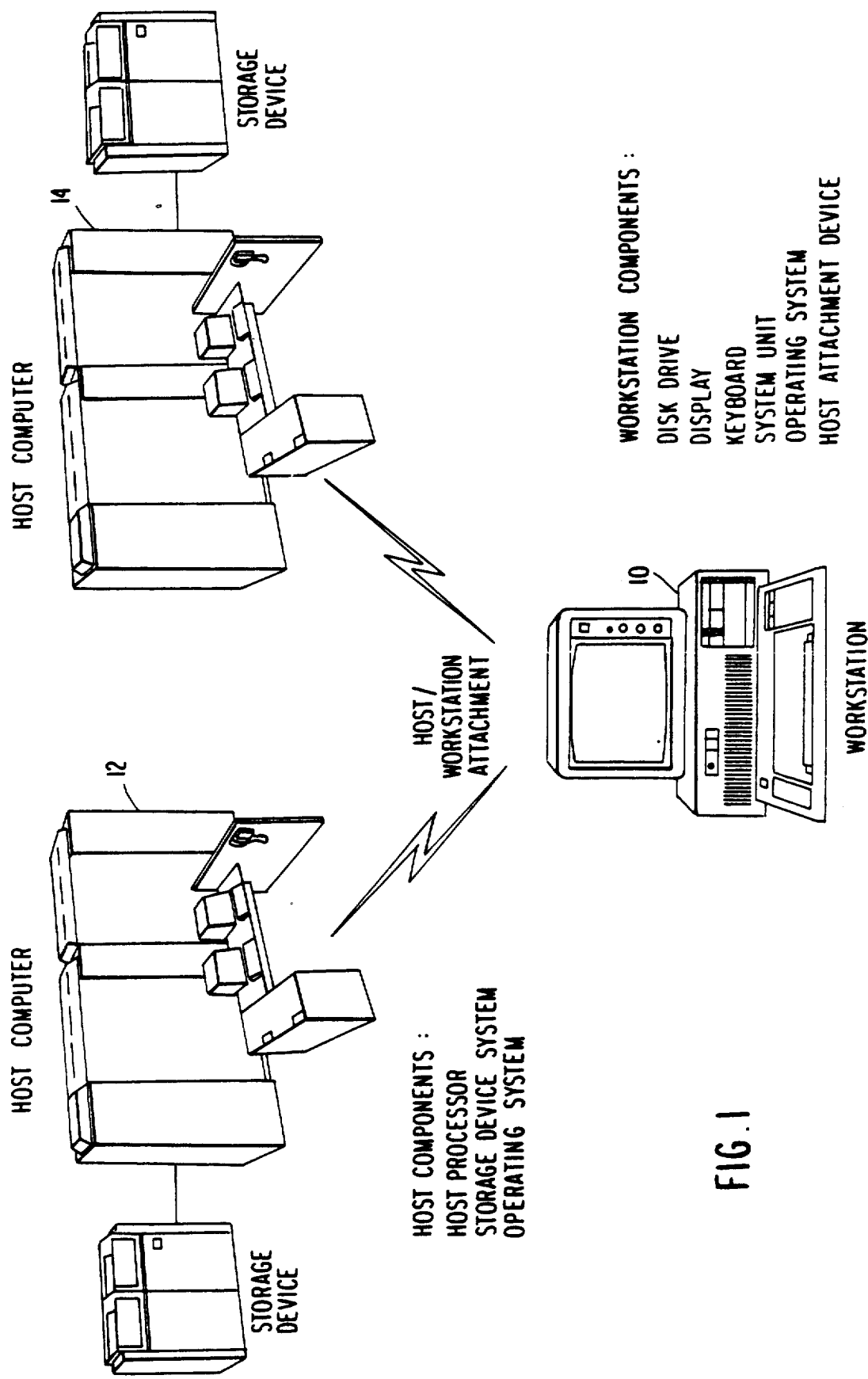

FIG.2

```
                           ‚20
Download directory ═══> C:\DOWNLOAD\
Host ID      ═══> A‚22
                              ‚24
Host Filename ═══> AUTOEXEC BATCH  A
                                      ‚26
IWS Filename ═══> C:\DOWNLOAD\AUTOEXEC.BAT
       Options ═══> CRLF ASCII ‚28
              ‚30          ‚32      ‚34                            ‚36
host filename       host     env host filename              options AUTOEXEC BATCH      A        VM  AUTOEXEC BAT      A        CRLF ASCII
COMMAND  COMBIN     A        VM  COMMAND  COM      A
CONFIG   SYSBIN     A        VM  CONFIG   SYS      A
MYPROG   BATBIN     A        VM  MYPROG   BAT      A
VDISK.SYS                    MVS SEHORNE.VDISK.SYSBIN
```

FIG.3

```
C:\*.* filename       host   env    host filename              options
   .              A      VM     *                   *
   ..             A      VM     *                   *
   AUTOEXEC.BAT   A      VM     AUTOEXEC BATCH      A      CRLF ASCII
   COMMAND.COM    A      VM     COMMAND  COMBIN     A
   CONFIG.SYS     A      VM     CONFIG   SYSBIN     A      LRECL 512 RECFM V
   VDISK.SYS      B      MVS    SEHORNE.VDISK.SYSBIN        LRECL 512 RECFM V
```

MANAGING HOST TO WORKSTATION FILE TRANSFER

BACKGROUND OF THE INVENTION

1. Field of the Invention

This invention generally relates to file transfers between a workstation and a host computer and, more particularly, to the maintenance of consistent filename conventions between multiple hosts and intelligent workstations. Files are received from and sent to the host computer by workstations. An additional feature is the use of default file transfer options based on the file name which relieves the user from explicitly defining each of the parameters associated with a particular file.

2. Description of the Prior Art

The past several years have seen the growth of online workstations such as personal computers (PCs), the evolution of distributed processing, and the acceleration of information technology in many new application areas. The result has been an increase in the use of PCs as intelligent workstations in host environments and the need to manage files that exist on a PC workstation attached to a host.

One of the fundamental file management concerns is the transferring of files between systems. File transfer from one computing system to another has been accomplished by the user manually asking for the individual file to be transferred and specifying the required options for the transfer to be accomplished successfully. However, the options had to be remembered by the operator which often led to confusion, improperly translated files and poor utilization of disk space. In addition, there was very little standardization of file naming conventions.

The concept of standardizing filenames has been used in systems such as the Customer Information Control System/Operating System/Virtual Storage (CICS/OS/VS) Performance Analysis Reporting System/MVS product of the IBM Corp. This system uses an installation technique common to most IBM systems that run on the Multiple Virtual Sessions (MVS) operating system. The technique involves defaulting the filenames and file organizations of the files that are used by the Program Product. The Job Control Language (JCL) used to create the data sets and accommodate the program product have default names and other parameters defining the files. The JCL transfers data sets from tape to disk and maintains consistent filename conventions. Sample JCL is provided on the tape to relieve the user of the burden of defining each parameter associated with a file. However, this is a one time installation process and does not accommodate file transfers between workstations and host computers.

Techniques for managing a processor's disk storage system are also common. A good example of one such system is the IBM Systems Modification Program Extended (SMP/E) 5668-949 which is a tool for managing programs installed as described above. The tool is a Program Product that IBM's customers use to manage the installation and program updates of Program Products. The installation tasks involve defaulting many parameters and relieving the user of the change management burden. The SMP/E program does not provide any tools for managing additional copies of the programs for workstations or multiple hosts.

The Smartcom II product from Hayes Microcomputer Products provides a communication initialization menu that defaults all the parameters of a communications line to specific values based on common parameters used by many users. The parameters can be overridden by the user by typing over the entry. This technique relieves the user of the burden of remembering all of the parameters commonly used to support a communications session. The parameters are not coordinated with the particular workstation or host computer with which the user is trying to communicate. Therefore, the user must have enough familiarity with the communications environment to override the default parameters with the correct parameters, such as baud rate, parity, stop bits and so forth, that correspond with the particular device with which communications is to be established.

Ways of assuring the integrity of two files on the same processor are also known in the art. Two techniques are described in "System-Supplied Data Integrity" by J. A. Mortenson et al *IBM Technical Disclosure Bulletin*, vol. 25, no. 7B, December 1982, pages 3718 to 3721, and in "Data Base Security/Authorization Mechanisms" by A. M. Herzik et al., vol. 28, no. 3, August 1985, pages 942 to 947. These publications disclose ways of assuring consistency between stored data and the descriptive information associated with the data and management tools for securing data files and file descriptions. The article by J. A. Mortenson et al. describes a system that distributes any change in one file to all copies of the file under the control of the system. The article by A. M. Herzik et al. discloses a method for creating logical views of a file for updating and changing multiple copies of a file simultaneously.

None of these methods provides a method for managing data transferred back and forth between multiple hosts and workstations that relieves the user of the burden of specifically describing the data characteristics. There are host file transfer programs that allow a user to construct a list of files to be transferred, but there is no support for file transfer to dissimilar systems that are available to the user. There is no satisfactory solution in the prior art to the problem of transferring files between host computers and workstations.

SUMMARY OF THE INVENTION

It is therefore an object of this invention to provide a method for sending files to a host from a workstation or receiving files from a host by a workstation.

It is a further object of this invention to provide a technique which allows the user to select a set of files to send or receive between a host computer and a workstation.

It is a further object of this invention to provide a technique which maintains consistent filename conventions between files existing on multiple hosts and workstations.

It is a further object of the invention to provide a semi-intelligent file transfer option preselection which relieves the user of the burden of explicitly defining each of the parameters associated with a particular record.

According to the invention, these objects are accomplished by providing a table of default parameters for various hosts and workstations and the corresponding file types that are accessed to determine the default parameters and file types for a given file. A set of screens are also provided to obtain the name or names of files to be transferred and to where the files are to be transferred. The programs which produce these screens also obtain and display default information concerning the files, such as, the file names and the data structures in which the files will reside at the destination host computer or workstation. The user can either accept the default information or change it.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 1 is an illustration of the hardware system environment in which a file transfer from a workstation to two host systems is depicted;

FIG. 2, is an illustration of the screen layout of the file transfer screen for uploading and downloading files from a workstation to a host computer;

FIG. 3 is an illustration of the screen layout for the fast select process;

DETAILED DESCRIPTION OF THE PREFERRED EMBODIMENT OF THE INVENTION

Figure 4:
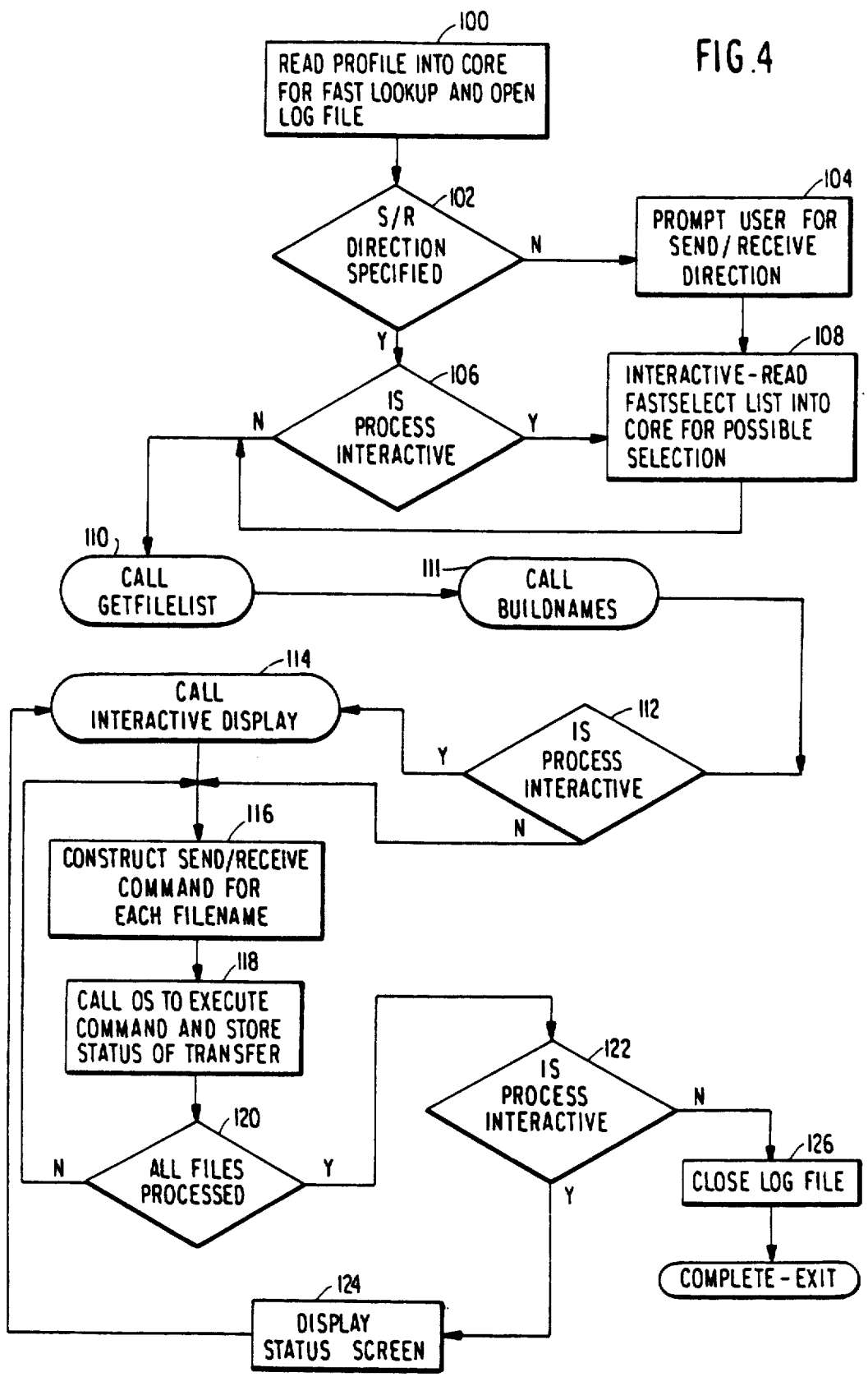
FIG. 4 is a flow diagram showing the logic of main program for the send and receive functions of the process according to the invention.

Referring now to the drawings, and more particularly to FIG. 1, there is an illustration of the hardware system environment in which a file transfer from a workstation to two host systems is depicted. The workstation 10 is a personal computer with a memory, data storage device, keyboard with multiple function keys and a communications adapter. HOSTA 12 is a host computer with a memory, data storage devices and a variety of attached display devices including the workstation 10. The IBM Virtual Machine (VM) operating system (OS) controls operations on HOSTA 12. HOSTB 14 is a host computer with a memory, data storage devices and a variety of attached display devices including the workstation 10. The IBM Multiple Virtual Systems (MVS) operating system controls operations on HOSTB 14.

The user of the workstation 10 has files on the workstation's data storage device. To transfer the files to either of the host computers, the user would normally have to specify the filename of the file on the workstation's data storage device, the host computer to which the file is to be sent, the filename under which the file is to be stored on the host computer, the data structure of the file on the host computer, and other optional information. This optional information includes whether to convert the file from ASCII to EBCDIC and whether to concatenate characters onto the end of records, such as carriage returns or line feeds.

Both file naming conventions and host file storage format are specified in a file profile. The file profile also includes the host environment; i.e., operating system and other parameters. The file name will vary based on the type of operating system that is resident on the host. Files sent to an MVS host will require the user's "userid" to be appended to the filename, while files sent to a VM host will require that the user's minidisk letter be concatenated to the filename and filetype. For example, a file named "AUTOEXEC.BAT" on the workstation would be named "AUTOEXEC BAT X" on a VM host and "XSTRINGX.AUTOEXEC.BAT" on an MVS host. To require the user to specify this information each time a file is transferred would be extremely burdensome.

The invention provides an application program residing on the workstation to manage the sending of files to the host computers and to manage the receiving of files from the host computers transparently without regard to host operating systems. A profile table comprised of host identifiers, file names and characteristics of the files is provided on the workstation's data storage device. This profile table is used by the program to translate file names and file characteristics between the workstation and various host computers and to provide default information used in the transfers. The workstation's profile information comprises four parts, which are:

(1) The environment for each available host;
(2) The default disk for VM or "userid" prefix for MVS;
(3) The default options for the file;
(4) Optional data to use in creating the host filetype; and
(5) Function key assignments.

The environment is the default operating system that is resident for each of the available hosts. In the illustrated case, HOSTA 12 has a VM environment and HOSTB 14 has an MVS environment.

The default disk is the default area on the host data storage device in which the file will be stored. On a VM host, this is an alpha character that corresponds to a user's minidisk. Normally this will be the character A. On an MVS host, this is the user's logon identification name. For example, XSTRINGX would act as a high level qualifier for the data set to distinguish it from other user data sets. If a UNIX TM (trademark of Bell Laboratories, Inc.) host were used, the user's logon would also be used as the default directory.

The profile file also contains default options that specify the preselection information. This information includes data structure information for the filename, translation information, appended characters and other information that would normally be specified each time a file was transferred to a host. This information is presented to the user as the default characteristics that the user can choose to accept or modify to their specifications.

The profile file also contains optional data used to construct the host file type. The profile file is used by the send and receive file program to relieve the user from the burdensome chore of remembering details of file information for various hosts.

The following description is given by way of illustration only. For example, function key assignments are arbitrary, and in any implementation, different assignments may be made. In other words, the file transfer process according to the invention is fully customizable according to specific preferences and specific applications.

FIG. 2 is an illustration of the screen layout of the file transfer screen for downloading and uploading files from a workstation to a host computer. The same display is used to send and receive files. The user chooses the send or receive operation by pressing function key seven (F7) to send or function key eight (F8) to receive. A field is provided for the user to specify the target directory of the workstation at field 20. The directory corresponds to an entry in the Disk Operating System (DOS) file structure on the personal computer (PC) workstation. The user completes the directory field as shown with an identifier of the drive, C: and the directory DOWNLOAD at field 20. This identifies to the file transfer program to what directory on the work station a host file is to be copied in a receive or download operation or, in a send operation or upload operation, from where the files originate. The user must next identify what Host the file is to be copied from at field 22. Each host that is known to the system is given a unique alpha identifier. The user must identify the specific Host filename at field 24. This file may be explicitly entered by the user or a wildcard expression can be used to select a set of files. For example, the user could enter * * A to copy every file on the A minidisk of the specified host. In this case, the user selected a set of files displayed at field 24 including the file named AUTOEXEC BATCH A. The program fills in defaults for the other parameters. The workstation filename at field 26 will be completed by looking up the file characteristics for a BATCH file on the A host and cross referencing these characteristics to the workstation to obtain the correct file extension, .BAT. This information is stored for each user on each host and workstation in a profile file. The information can be changed to reflect new information by the user.

When the host is identified, the user can select filenames to be transferred and they will be displayed at field 30 and the host that they reside on is presented at field 32. In addition, the operating system environment is presented at field 34 for each file. At field 36, the file transfer default options are presented to the user. The user can accept the default parameters as they are displayed or choose to override them with his or her own parameters.

When sending or receiving files from a host at a workstation, the user is presented with a screen that has two data areas as indicated in FIG. 2. User entry areas include the Download directory in field 20, Host id in field 22, filename in field 24, workstation filename in field 26 and the options in field 28. The workstation filename in field 26 and the options in field 28 will be defaulted from the user's profile file. The user has the option of overriding any defaulted field. The list area at field 30 displays the filenames that have already been accepted. The filenames have either been individually selected or selected from the fast select screen. The fast select screen displays a list of user selected filenames that can be selected and appended to the files to be sent to or received from the host computer. Selections made from this screen are added to the list of files displayed in the list area at field 30.

The default directory indicated at field 20 is taken from the user profile. The filename is constructed as discussed above depending on whether the host operating system is VM or MVS. Regardless of the host operating system, the options are selected by matching the file extension with the concatenated EXT and APPEND fields. This allows the user to construct different receive options for files that have the same EXT fields but different APPEND fields. If no match exists, then the first entry in the profile file will be used. For example, if one set of files were BATCH files and the other set were BATBIN files, the user could

| EXT | APPEND | OPTIONS |
|-----|--------|---------|
| BAT | CH     | ASCII CRLF |
| COM | BIN    |         |

The options selected for MYPROG BATCH A would be ASCII CRLF, while the options selected for MYPROG BATBIN would be null. The user can select and edit a filename from the list area at field 30. The filename and its current information is presented in the upper portion of the screen for editing and replaced after any corrections by pressing function key three to save.

An example of the fast select screen is shown in FIG. 3. The files are listed with their workstation counterparts and the default options. When the list is completed, the user has the option of verifying which workstation files will be replace by the list of filenames. The files that will be replaced are highlighted to allow the user to determine any conflicts that may occur. If the user does not want the conflicting file to be replaced, the list can be edited and the filename renamed to avoid any conflicts.

FIG. 4 is a flow diagram of the main send and receive logic of the invention. The purpose of this logic is to interpret program parameters passed from the user and to determine the SEND/RECEIVE option and a possible list of files to process. The process begins at function block 100 where a profile is read into core or main memory for fast look up and a log file is opened. A test is made in decision block 102 to determine if the send or receive direction is specified. If not, the user is prompted in function block 104 to input the send or receive direction; otherwise, a test is made in decision block 106 to determine if the process is interactive. If the user has been prompted in function block 104 for send or receive direction or if the test in decision block 106 is true, the access FASTSELECT list function 108 is read into core or main memory for possible selection. The access FASTSELECT list function is shown in FIGS. 5A and 5B and is described in more detail hereinafter.

Figure 7:
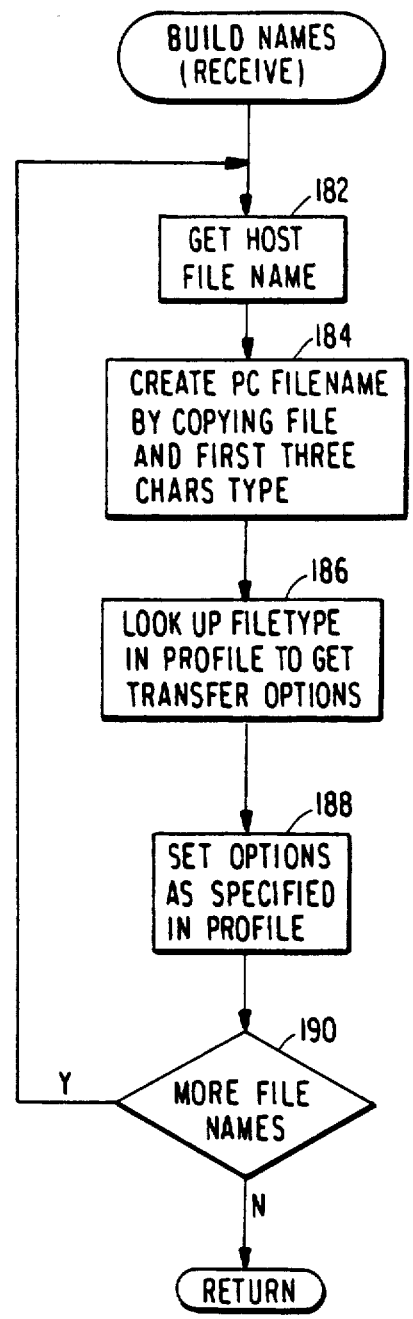
FIG. 7 is a flow diagram showing the logic of the subroutine BUILDNAMES for the receive function called from the main program shown in FIG. 4.
Figure 8:
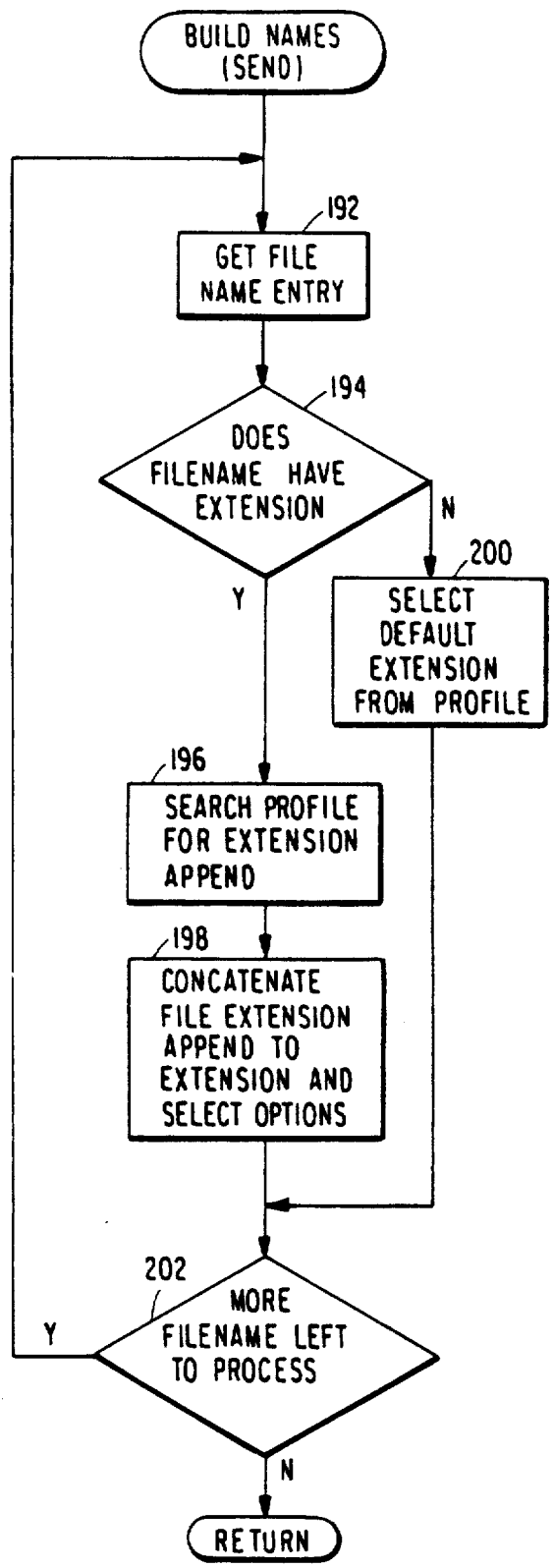
FIG. 8 is a flow diagram showing the logic of the subroutine BUILDNAMES for the send function, called from the, main program shown in FIG. 4.

At this point, a subroutine GETFILELIST is called in operation block 110. This subroutine, shown in more detail in FIG. 6, constructs an array of filenames to transfer. When that list has been constructed and a return has been made to the main program, a subroutine BUILDNAMES is called in operation block 111. The BUILDNAMES subroutine is different for the receive or send functions. The subroutine for the receive function is shown in FIG. 7, and the subroutine for the send function is shown in FIG. 8. These subroutines are a host filename construction and parameter routine which uses the previously constructed array of files to be transferred.

When a return has been made to the main program, control is passed via connector A to decision block 112 in FIG. 4 where a test is made to determine if the process is interactive. If so, a call is made in operation block 114 to an interactive display routine, shown in more detail in FIG. 9. If the process is not interactive, control goes directly to function block 116 where the SEND/RECEIVE command is constructed for each filename Next, a call is made in function block 118 to the operating system (OS) to execute the command and store the status of the transfer. Next, a test is made in decision block 120 to determine if all the files have been processed. If not, control loops back to function block 116; otherwise, a test is made in decision block 122 to determine if the process is interactive. If so, the status screen is displayed in function block 124; otherwise, the log file is closed in function block 126 before the process ends.

The following pseudocode, written in Program Design Language (PDL), implements the logic illustrated in the flow diagram of FIG. 4. A programmer skilled in the art can write source code in any suitable programming language, such as Pascal, C or BASIC, from which object code can be derived by a suitable compiler.

```
IF (SEND/RECEIVE not specified) THEN
    query user for direction of transfer and set
        prompt=TRUE
ENDIF
    read profile into core for fast lookup /*always*/
IF (prompt) THEN /*do not read fast select file if
    in batch mode*/
    read FASTSELECT LIST into core for possible
        selection /*used by interact*/
ENDIF
    call GETFILELIST /*construct array of filenames
        to transfer*/
    call BUILDNAMES /*host filename construction/
        parameter routine*/ /*BUILDNAMES uses an array
        of files to be transferred*/
:SCREENIENTRY
IF (prompt) THEN
    call INTERACT /*allow user interaction and
        selection modification via call to Interact*/
ENDIF
    /*at this point there is a full list of files to
        transfer*/
    call sprint type routine to build actual exec
        line
    call OS to execute send command (log RC from each
        transfer)
IF (prompt) THEN
    display status of transferred files
    query user to return to Screenlentry (via flag)
ENDIF
If flag THEN
    goto SCREENIENTRY
ENDIF
    close log file
EXIT program
```

Figure 5:
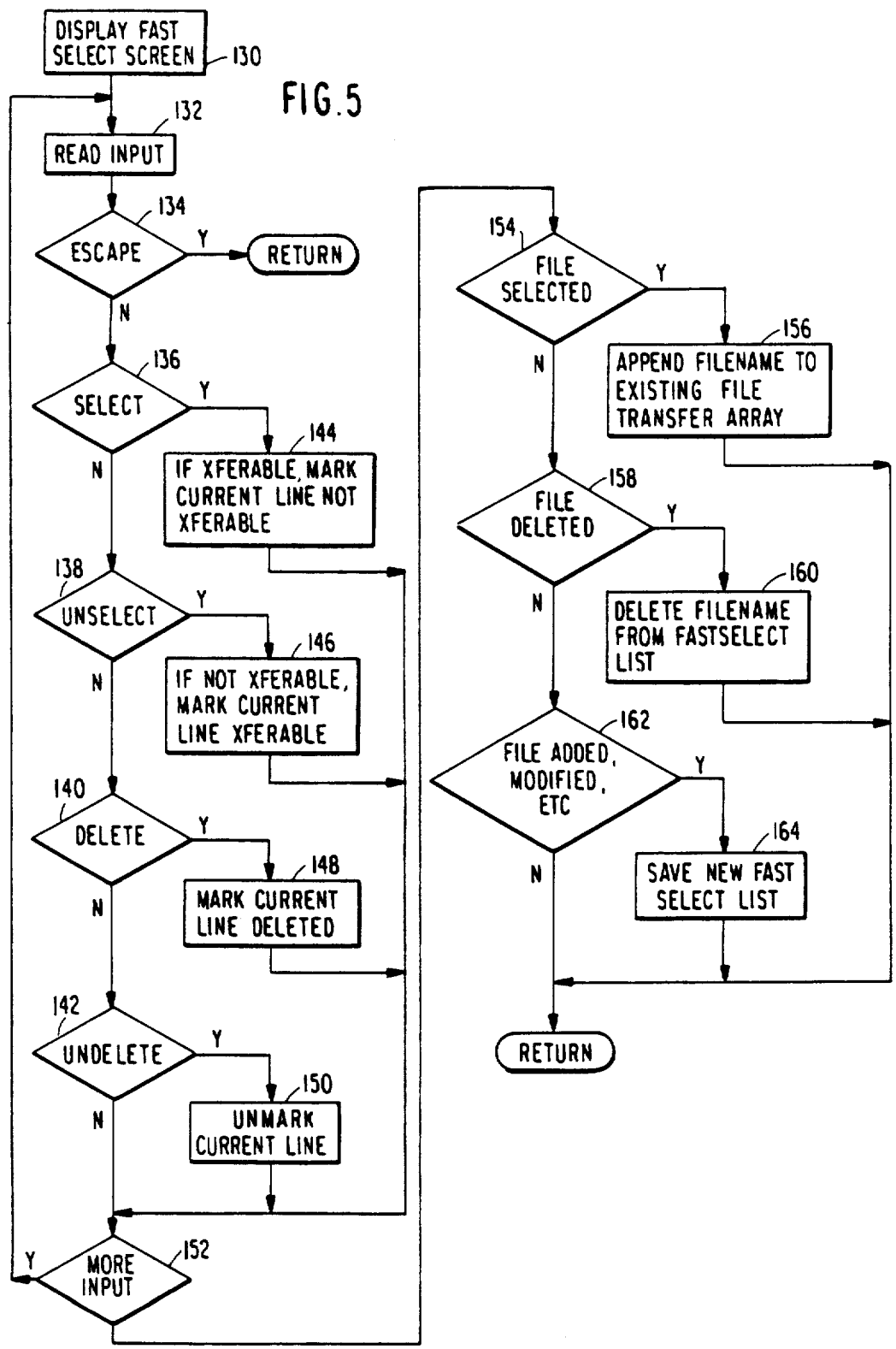
FIG. 5 is a flow diagram showing the logic of the access FASTSELECT list function performed in the main program shown in FIG. 4.

FIG. 5 shows the flow diagram for the logic for the access FASTSELECT list function performed in function block 108 in FIG. 4. This logic accesses the Fastselect list and looks up key definitions in the profile table stored in core or main memory. The process begins by displaying the fast select screen shown in FIG. 3 in function block 130. The input to the screen is read in function block 132, and then a series of tests are made to monitor the user input. The first of these is to determine if the user has pressed the ESCAPE key in decision block 134. If so, a return is made to the main program; otherwise, tests are made in decision blocks 136 for user select input, 138 for user unselect input, 140 for delete, and in 142 for undelete. In each case, if the test is positive, the appropriate operation is performed. Thus, when a select input is detected in decision block 136, the current line is marked as not transferrable in function block 144. When an unselect input is detected in decision block 138, the current line is marked as transferrable in function block 146. When a delete input is detected in decision block 140, the current line is marked as deleted in function block 148. When an undelete input is detected in decision block 142, the current line is unmarked in function block 150. In each case, the user input is monitored in decision block 152, and if more input is detected, control loops back to function block 132 to read the input; otherwise, control goes to decision block 154 in FIG. 5 via connector B.

A test is made in decision block 154 to determine if the file was selected, and if so, the filename is appended in function block 156 to the existing file transfer array. If not selected, a test is made in decision block 158 to determine if the file was deleted, and if so, the file name is deleted in function block 160 from the FASTSELECT list. If not deleted, a test is made in decision block 162 to determine if the file is added or modified, and if so, a new fast select list is saved in function block 164. When this process is complete, a return is made to the main program The following pseudocode, written Program Design Language (PDL), implements the logic shown in the flow diagram of FIG. 5.

```
/*Do this for 'number of files' passed to this
function. This allows function to be used both
in batch for a long list of files or from the
interactive screen by passing one file at a
time.*/
IF (send) THEN
FOR (i=0; i < number_of_files_to_xfer ; i++)
    /*A host file is built on send extension by
        using IWS file extension XXX as character
        string to select profile entries 'APPEND' and
        'OPTIONS' by simple compare of EXT field in
        profile to XXX from current filename being
        constructed.*/
    PARSE file extension /*Get .XXX part of IWS
        filename. This is done by scanning for . in
        file name*/
    IF strlen(EXT[i]) == 0 THEN /*If no file
extension*/
        */Select default option, i.e., profile entry 0*/
        host_filetype [i] = strcat('XXX', APPEND[0])
        xfer_option[i] = OPTIONS[0]
    ELSE
        complete[i] = FALSE;
        FOR (j=0, j <number_of_profile_entries; x++)
            IF (XXX[i] == EXT[j]) THEN /*when match*/
                host_filetype[i] = strcat('XXX', APPEND[j])
                xfer_option[i] = OPTIONS[j]
                complete[i] = TRUE
            ENDIF
            IF complete THEN
            ELSE
                host_filetype[i] = strcat('XXX', APPEND[0])
                xfer_option[i] = OPTIONS[0]
            ENDIF
        END-FOR
    ENDIF
END-FOR /*do more files until done!*/
RETURN
```

Figure 6:
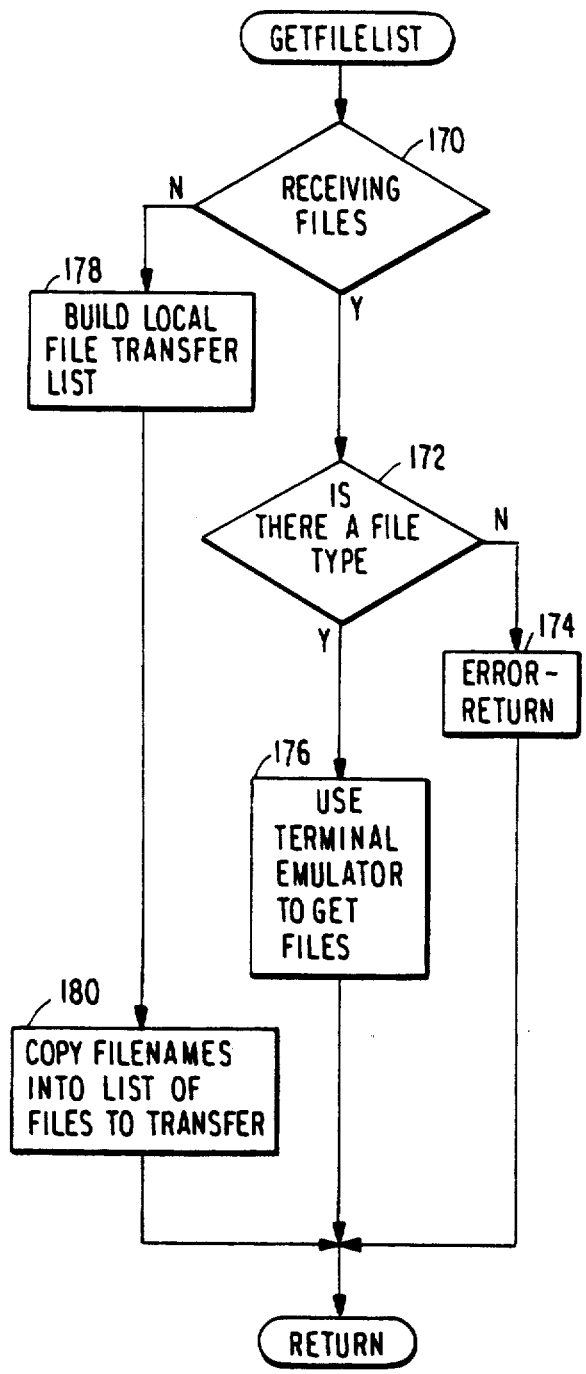
FIG. 6 is a flow diagram showing the logic of the subroutine GETFILELIST called from the main program shown in FIG. 4.

FIG. 6 is the flow diagram for the GETFILELIST subroutine called in operation block 110 in FIG. 4. This subroutine begins by determining in decision block 170 whether the operation is to receive files. If so, a test is made in decision block 172 to determine if a file type is specified. If not, an error message is displayed in function block 174, and a return is made to the main program. If there is a file type specified, the user terminal emulator is invoked to receive the files in function block 176. The user terminal emulator used in a specific implementation of the invention was the IBM 3270-PC Control Program and the High Level Language Application Program Interface (API) first published in 1984. Other computer terminals and emulators can be used in the practice of the invention. At this point, a return is made to the main program in FIG. 4A.

If files are to be transmitted to a host computer, the test in decision block 170 will be negative, and a local file transfer list is built in function block 178. Then, in function block 180, the file names are copied into a list of files to transfer before a return is made to the main program.

The following pseudocode, written in Program Design Language (PDL), implements the logic shown in FIG. 6.

```
IF (receive) THEN
    Parse file name /*get filetype of HOST filename*/
    IF strlen(EXT[i]) = = 0 THEN /*If no file extension*/
        TERMINAL ERROR! EXIT! HOST FILETYPE MUST BE SPECIFIED or '*' used;
    ELSE
        Use emulation interface to get host filename list;
        EXAMPLE:
            FOR VM systems
                Pass 'CMS LIST * * a (EXEC' to host and execute.
                Call OS to execute receive program to get access to file list.; Build filename
                    array using host filename list as source.
                Copy host filename into list_of_files_to_transfer
ELSE /*must be send*/
    Build file transfer list (array) using OS filesearch
    Copy filenames into list_of_files_to_transfer ENDIF
```

FIG. 7 shows the logic of the BUILDNAMES receive function. This is the subroutine called in operation block 111 in FIG. 4 when a transfer is to be made from a host computer to the personal computer. The process begins at function block 182 where the host file name is retrieved. In function block 184, a personal computer file name is created by copying the host file and the first three characters of the file type. In function block 186, the file type is looked up in the profile to get the transfer options, and the options as specified in the profile are set in function block 188. A test is then made in decision block 190 to determine if there are more file names. If so, control loops back to function block 182 to process the next file; otherwise, a return is made to the main program.

The following pseudocode, written in Program Design Language (PDL), implements the logic shown in FIG. 7.

```
/*BUILDNAMES RECEIVE FUNCTION*/
ELSE /*must be receive*/
    FOR (i-0; i < number_of_files_to_xfer; i++)
        /*IWS name is built on receive by stripping all
            characters except first three from the host
            file type, yielding XXX. By simple compare of
            the host filetype (all eight characters) to
            the combined EXT and APPEND fields, the
            proper transfer options are obtained.*/
        Complete[i] = FALSE;
        /*Copy first three characters of host
            filetype*/
        strcpy(host filetype[i],IWS_ext[i],3)
        FOR (j=0, j < number_of_profile_entries; x++)
            IF (host_filetype[i] = = EXT[j]+APPEND[j])
                THEN /*when match*/
                    xfer_option[i] = OPTIONS[j]
                    complete[i] = TRUE
                    j=number_of_profile_entries; /*stop
                        searching*/
            ENDIF
            IF complete THEN /*do nothing*/
```

```
            ELSE
                xfer_option[i] = OPTIONS[0]
            ENDIF
        END-FOR
    ENDIF
END-FOR /*do more files until done!*/
RETURN
ENDIF
```

FIG. 8 shows the logic of the BUILDNAMES subroutine called in operation block 111 when the option of sending files to a host computer is selected. The process begins in function block 192 where the file name entry is retrieved. A test is then made in decision block 194 to determine if the file name has an extension. If so, the profile is searched in function block 196 for the extension append, and then the file extension append is concatenated in function block 198 to the extension and select options before control goes to decision block 202. On the other hand, if the file name does not have an extension, as determined by the test in decision block 194, a default extension is selected from the profile in function block 200 before control goes to decision block 202. In decision block 202, a test is made to determine if more file names are left to process. If so, control loops back to function block 192; otherwise, a return is made to the main program.

The following pseudocode, written in Program Design Language (PDL) implements the logic shown in FIG. 8.

```
: BUILDNAMES (number_of_files_to_xfer, *array of files)
*do this for 'number of files' passed to this
function. This allows function to be used both in
batch for a long list of files or from the
interactive screen by passing one file at a time.*/
IF (send) THEN
    FOR (i=0; i < number_of_files_to_xfer; i++)
        /*The host file on send extension is built
            using IWS file extension XXX as character
            string to select profile entries 'APPEND' and
            'OPTIONS' by simple compare of EXT field in
            profile to XXX from current filename being
            constructed.*/
        Parse file extension /*get .XXX part of IWS
            filename. This is done by scanning for . in
            filename*/
        IF strlen(EXT[i]) = = 0 THEN /*if no file
            extension*/
            /*select default option, i.e. profile entry
                0*/
            host_filetype[i] = strcat('XXX', APPEND[0])
            xfer_option[i] = OPTIONS[0]
        ELSE
            complete[i] = FALSE;
            FOR (j=0, j < number_of_profile_entries; x++)
```

```
              -continued
        IF (XXX[i] = = EXT[j]) THEN /*when match*/
            host_filetype[i] = strcat('XXX',
                APPEND[j])
            xfer_option[i] = OPTIONS[j]
            complete[i] = TRUE
        ENDIF
        IF complete THEN /*do nothing*/
        ELSE
            host_filetype[i] = strcat('XXX',
                APPEND[0])
            xfer_option[i] = OPTIONS[0]
        ENDIF
    END-FOR
  ENDIF
END-FOR /*do more files until done!*/
RETURN
```

Figure 9:
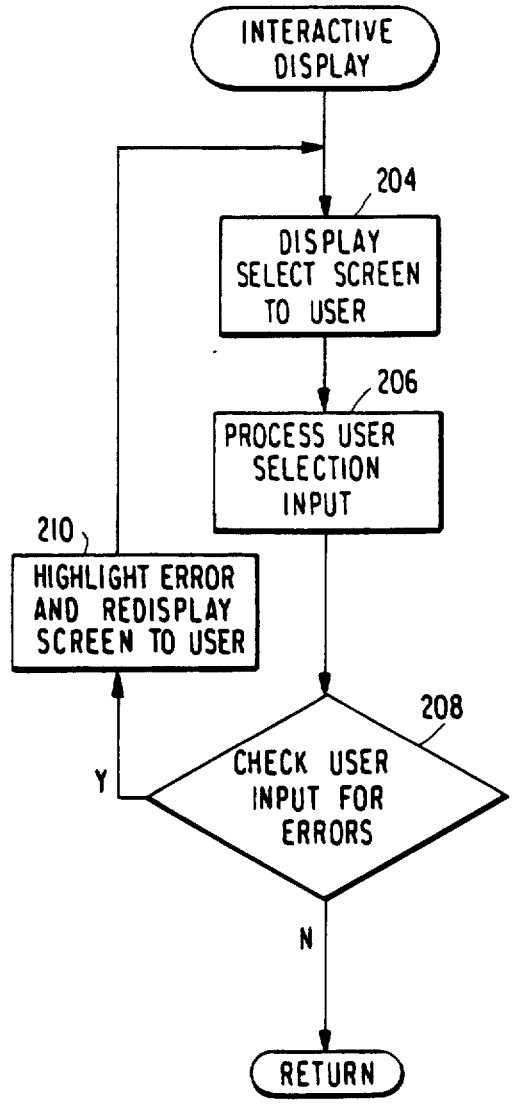
FIG. 9 is a flow diagram showing the logic of the subroutine for interactive display called from the main program shown in FIG. 4.

Turning next to FIG. 9, there is shown in more detail the interactive display routine called in operation block 114 in FIG. 4. This routine performs a lookup of key definitions in the profile table which is stored in core or main memory. In the flow diagram, the process begins by displaying the select screen to the user in function block 204. Next, in function block 206, the user input selection is processed. This is followed by a test in decision block 208 to determine if the user input is to be checked for errors. If so, any errors detected are highlighted in function block 210, and control loops back to function block 204 to redisplay the screen to the user; otherwise, a return is made to the main program.

The following pseudocode, in Program Design Language (PDL), implements the logic of the flow diagram shown in FIG. 9.

The user can employ a wild card capability to see all the files on a directory. If the entire directory is to be transferred, the user enters "." to indicate all files. This capability allows the user to conveniently backup a directory to a host. The user can also enter "..", which will display all the files in the parent directory. If the user presses function key ten (F10) while the cursor is positioned on a subdirectory, all the files in that subdirectory are selected for upload and displayed in a list area. The user can also press function key nine (F9) while the cursor is positioned on a subdirectory to display the files in that subdirectory.

After the files are selected, the user either accepts the default options for transfer or changes the options to meet the user's requirements. The default options are based on information that is user revisable and stored in the profile file on the workstation 10.

The format of the default options is as shown below:

| EXT | APPEND | OPTIONS |
|-----|--------|---------|
| BAT | CH | ASCII CRLF |
| COM | BIN | |
| EXE | BIN | LRECL 512 RECFM V |
| ASC | II | ASCII CRLF LRECL 255 RECFM F |
| OBJ | BIN | LRECL 512 RECFM F |
| PAS | CAL | ASCII LRECL 255 RECFM F |
| SYS | BIN | LRECL 512 RECFM F |

The APPEND field is appended to the file extension (EXT) field to form the host file type. The options such as Logical Record Length 512 bytes (LRECL 512),

```
WHILE not exit ok
    Display Screen1 using OS display services
    /*ALL FILES ARE INITIALLY SELECTED FOR TRANSFER*/
    /*Allow modification of default selections constructed by BUILDNAMES*/
    read keystroke
    xlate keystroke to function /*customizable?*/
    WHILE NOT (keydefinition = = 'execute')
        select keydefinition
            case 'fast_select'    : call Fast_select
            case 'add_FS_list'    : append current fileinfo to FASTSELECT LIST:
            case 'escape'         : return 1
            case 'delete'         : if current line is 'xfer able' then mark current
                                    list 'not xfer able'
            case 'undelete'       : if current line is 'not xfer able' then mark
                                    current line 'xfer able'
        end select
    END-WHILE
    /*Check modifications to insure no unknown parameters or format errors. This is
    done by conventional techniques by making compares to the 'OPTIONS' field
    contents of the profile. If an unknown error or 'type' is found, the field is high-
    lighted to show the error with the cursor under the offending option.*/
    IF errors THEN
        set exit-ok = FALSE
    ENDIF
END-WHILE
*Re-construct lies of files to be transferred by placing all selected files into the
    filename array.*/
FOR (i = 1; i < number of files in list; i+ +)
    IF file selected[i] THEN
        add filename to new array
    ENDIF
RETURN new array of files to transfer
```

Briefly reviewing, the send file process is facilitated by appropriate display screens generated by presentation services which are part of the file transfer application program. The user first selects the workstation's data storage device, i.e., disk drive, from which to retrieve files. Then the user selects the directory on the drive from which to select files. Next, the user selects the file, subdirectory or filename in the filename field.

Carriage Return Line Feed (CRLF), Record Format Fixed (RECFM F) explicitly define the data structure of the file on the host. The user can choose to accept the default options that are displayed, or overtype the entries to create new defaults. Once the options are selected, the file or files are transferred.

The user selects the files that are to be transferred. Then, the program builds the file names and the file attributes that the transferred file will use on the host computer. Next, the filenames and their associated attributes are displayed for verification and possible modification by the user on the display. The display screen is shown in FIG. 2, and the filenames and their associated attributes are shown at reference numerals 30, 32, 34, AND 36. The user can use the delete, spacebar, insert and cursor keys on the keyboard to change any of the defaulted attributes. Once the filenames and their associated attributes are correct, the file transfer logic is invoked. Files are transferred one at a time by repetitively calling a file transfer program to perform system dependant transfers of the files. The status of the transferred files is displayed on the screen for the user. Additional file transfers can be processed if any files remain for processing.

The display screen shown in FIG. 2 is also used to transfer files from a host computer to the workstation. The program accesses the profile table to obtain the default information discussed previously and displays this information on the screen illustrated in FIG. 2. Then, the entry processor processes keyboard entries by the user. The keyboard entries include editing functions such as delete, insert and other standard editing functions. In addition, the entry processor also differentiates between function key selections to carry out the save (function key three (F3)), send (function key seven (F7)), receive (function key eight (F8)) and fast select (function key five (F5)) functions. Whenever a file is selected by the user, the profile table is accessed to obtain default options for the file based on the filename, as discussed above. When the list of files has been entered by the user, the list processor is activated to receive the set of files from the host computer. The list processor processes the receive list. The receive list is processed one file at a time. Files are transferred one at a time by repetitively calling a file transfer program to perform system dependant transfers of the files. The file transfer program is passed the host and the workstation filenames, the direction of transfer (either send to the host or receive from the host) and the attributes of the file.

The receive file operation also employs the fast select processing. The fast select display is shown in FIG. 3 and controlled by the logic illustrated in FIG. 5. The fast select display is invoked by pressing function key five from the send/receive display. The user is presented with all the workstation or host filenames and their corresponding transfer options that the user has selected in previous operations from the fast select file. The user can use the fast select display to quickly select files.

While the invention has been described in terms of a preferred embodiment in a specific operating system environment, those skilled in the art will recognize that the invention can be practiced, with modification, in other and different operating systems within the spirit and scope of the appended claims.

Having thus described our invention, what we claim as new and desire to secure by Letters Patent is set forth in the following claims:

1. In a data processing system having at least a first host computer and a second host computer, each of said host computers comprising memory, data storage devices and one or more attached display devices, said first host computer running under a first operating system and said second host computer running under a second operating system different type from said first operating system, and a workstation constituting one of said display devices for each of said first and second host computers, said workstation having a memory, a display, a keyboard including a plurality of function keys and a data storage device with a resident profile table comprising appropriate data structures and names for files on the storage device of said workstation corresponding to respective files on storage devices of each of said first and second host computers operating under, respectively, said first and second operating systems, a method of transferring files between said data storage device of said workstation and one of said data storage devices of a selected one of said first or second host computers comprising the computer performed steps of:

displaying a select screen to a user of said workstation and processing user selection inputs to display said user selection inputs on said select screen, said user selection inputs including for each file to be transferred a send or receive transfer operation, the file to be transferred and a selection of one of said first or second host computers;

accessing said profile table to read an appropriate data structure and file name for each file to be transferred to or from a data storage device of a selected host computer and to generate default inputs for a file transfer, said default inputs including filenames with attributes, said filenames with attributes being displayed on said select screen for user verification and/or modification;

building a local file transfer list at said workstation when files are to be transferred to a selected host computer from said workstation and accessing a terminal emulator to get files when files are to be transferred from a host computer to said workstation; and invoking a file transfer program to transfer each of said files with said appropriate data structure and file name to or from said data storage device of said workstation from or to one of said data storage devices on the selected one of said first or second host computers.

2. The method of transferring files recited in claim 1 further comprising as part of said invoking step the step of giving said file transfer program a list of host and workstation filenames for each of the files to be transferred.

3. The method of transferring files recited in claim 2 further comprising the step of displaying on said workstation a screen showing the status of files being transferred during the operation of said file transfer program.

4. The method of transferring files recited in claim 1 wherein when a file transfer is to be made from said storage device of said workstation to one of the storage devices of a selected one of said first or second host computers, said step of accessing includes the steps of:

getting a file name from a user selection input on said select screen;

reading from said profile table a default extension appropriate to the operating system of the selected one of said first or second host computers if the file name does not have an extension; and reading from said profile table an extension append corresponding to an extension of said file name if the file name has an extension, and concatenating the extension append to a corresponding extension appropriate to the operating system of the selected one of said first or second host computers.

5. The method of transferring files recited in claim 1 wherein when a file transfer is to be made to said storage device of said workstation from one of the storage devices of a selected one of said first or second host computers, said step of accessing includes the steps of:

getting a host file name from a user selection input on said select screen;

creating a workstation filename using said host file name; and reading from said profile table transfer options.

6. The method of transferring files recited in claim 1 wherein said function keys of said keyboard of said workstation are used to select said send or receive transfer operation and files to be transferred.

* * * * *